United States Patent [19]

Fujiki

[11] Patent Number: 5,737,603
[45] Date of Patent: Apr. 7, 1998

[54] DATABASE SYSTEM CAPABLE OF CARRYING OUT AN EFFICIENT FREE AREA SEARCH

[75] Inventor: Yukiko Fujiki, Tokyo, Japan

[73] Assignee: NEC Corporation, Tokyo, Japan

[21] Appl. No.: 526,307

[22] Filed: Sep. 11, 1995

Related U.S. Application Data

[63] Continuation of Ser. No. 903,826, Jun. 24, 1992, abandoned.

[30] Foreign Application Priority Data

Jun. 24, 1991 [JP] Japan ................ 3-178695

[51] Int. Cl.$^6$ .................................................. G06F 12/00
[52] U.S. Cl. .............. 395/621; 395/497.02; 395/497.03; 395/497.04
[58] Field of Search ................ 395/600, 497.01, 395/497.02, 497.03, 497.04, 412, 402, 404, 621, 622

[56] References Cited

U.S. PATENT DOCUMENTS

| | | | |
|---|---|---|---|
| 4,536,837 | 8/1985 | Olson et al. | 395/600 |
| 4,849,878 | 7/1989 | Roy | 395/600 |
| 5,021,946 | 6/1991 | Korty | 395/600 |
| 5,034,914 | 7/1991 | Osterlund | 395/425 |
| 5,107,481 | 4/1992 | Miki et al. | 369/59 |
| 5,200,864 | 4/1993 | Dunn et al. | 395/600 |
| 5,247,660 | 9/1993 | Ashcraft et al. | 395/600 |
| 5,276,840 | 1/1994 | Yu | 395/600 |
| 5,339,411 | 8/1994 | Heaton, Jr. | 395/600 |
| 5,375,233 | 12/1994 | Kimber et al. | 395/600 |
| 5,548,751 | 8/1996 | Rye et al. | 395/600 |

OTHER PUBLICATIONS

Tanenbaum, *Operating Systems: Design and Implementation*, 1987, pp. 251–273.

Primary Examiner—Thomas G. Black
Assistant Examiner—Hosain T. Alam
Attorney, Agent, or Firm—Foley & Lardner

[57] ABSTRACT

In a database system of the present invention, a storage range in the data storage area has a control record storing the address of the additional range in the overflow area and the upper additional ranges constituting the additional range have control records storing the addresses of the connected lower additional range or ranges and of another upper additional range connected and the free area data for the connected lower additional ranges. In searching for a free area, storage range free area checking means judges whether the storage range has any free area, and upper additional range free area checking means judges whether the upper additional range has any free area. For existence of free area in lower additional ranges, lower additional range free area checking means refers to the free area data for the lower additional ranges stored in the control record of the upper additional range and judges whether a free area exists or not.

7 Claims, 7 Drawing Sheets

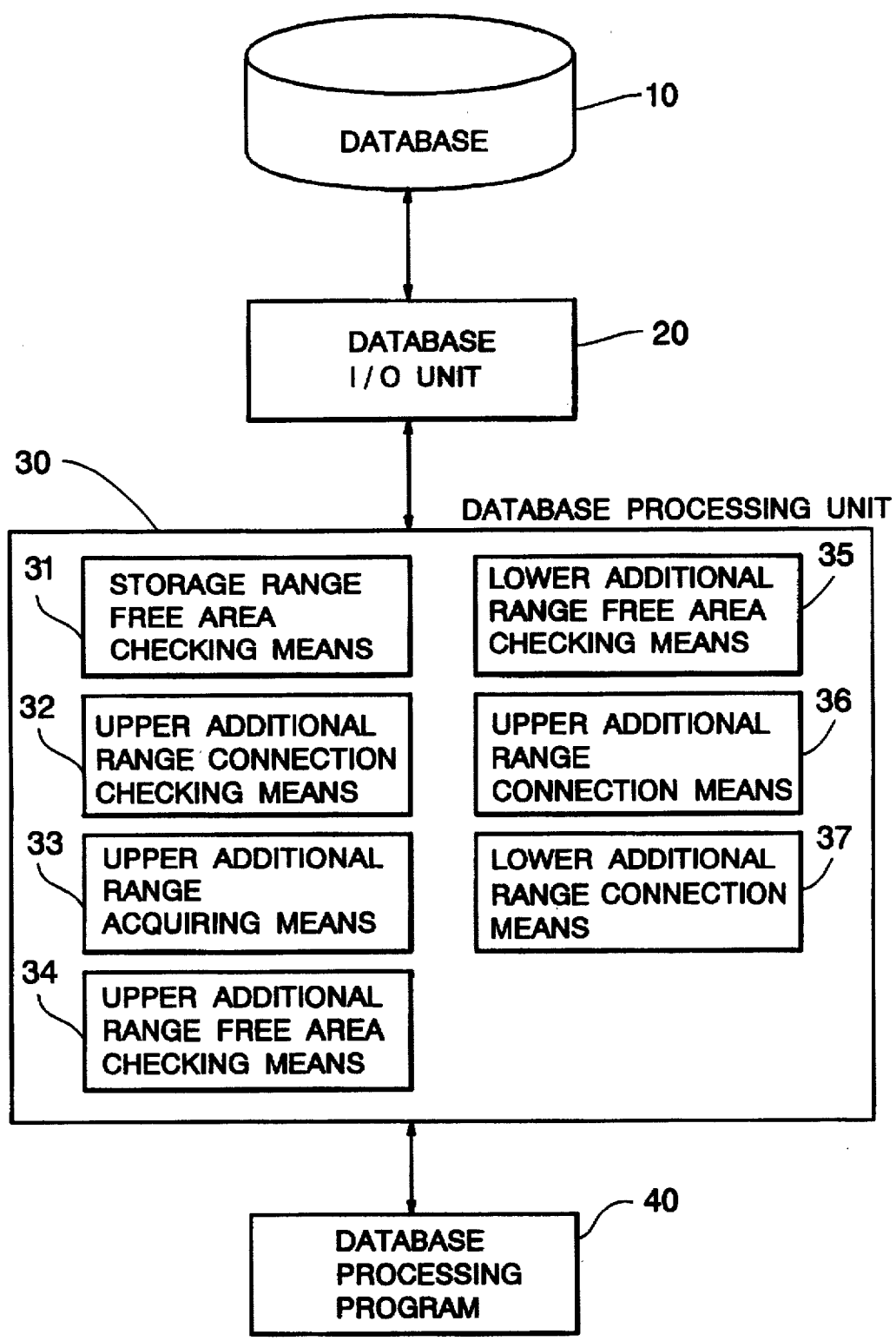

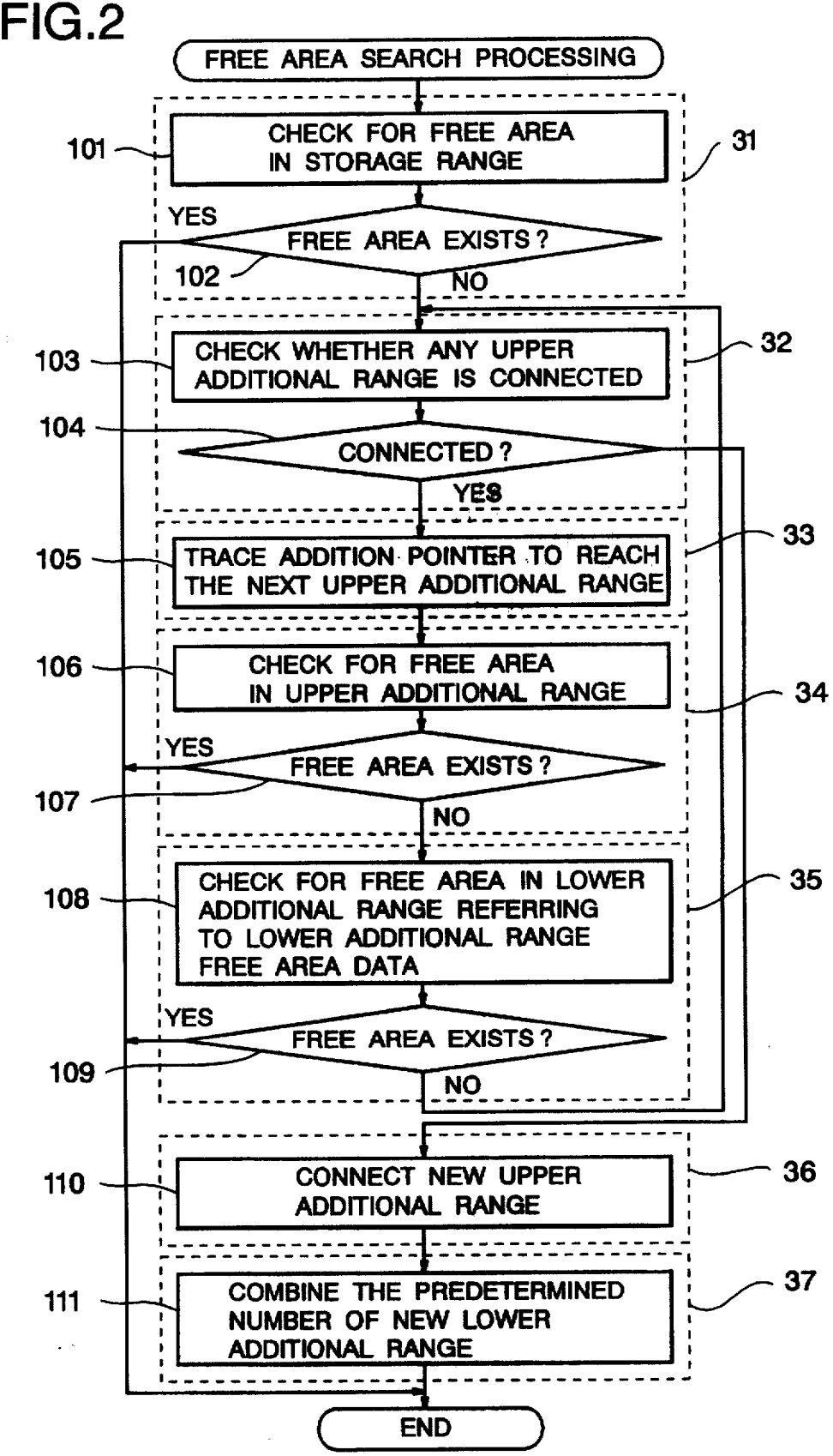

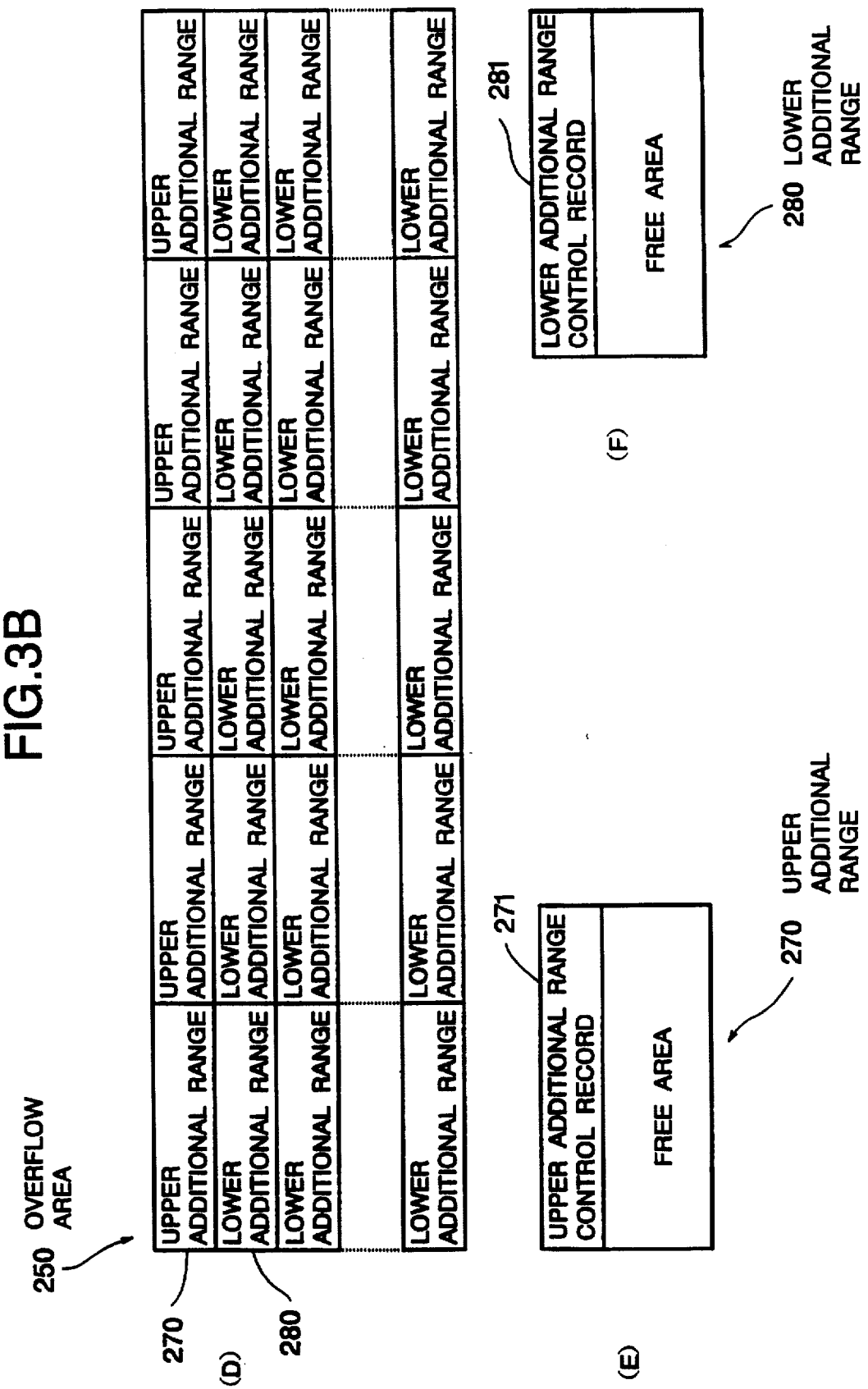

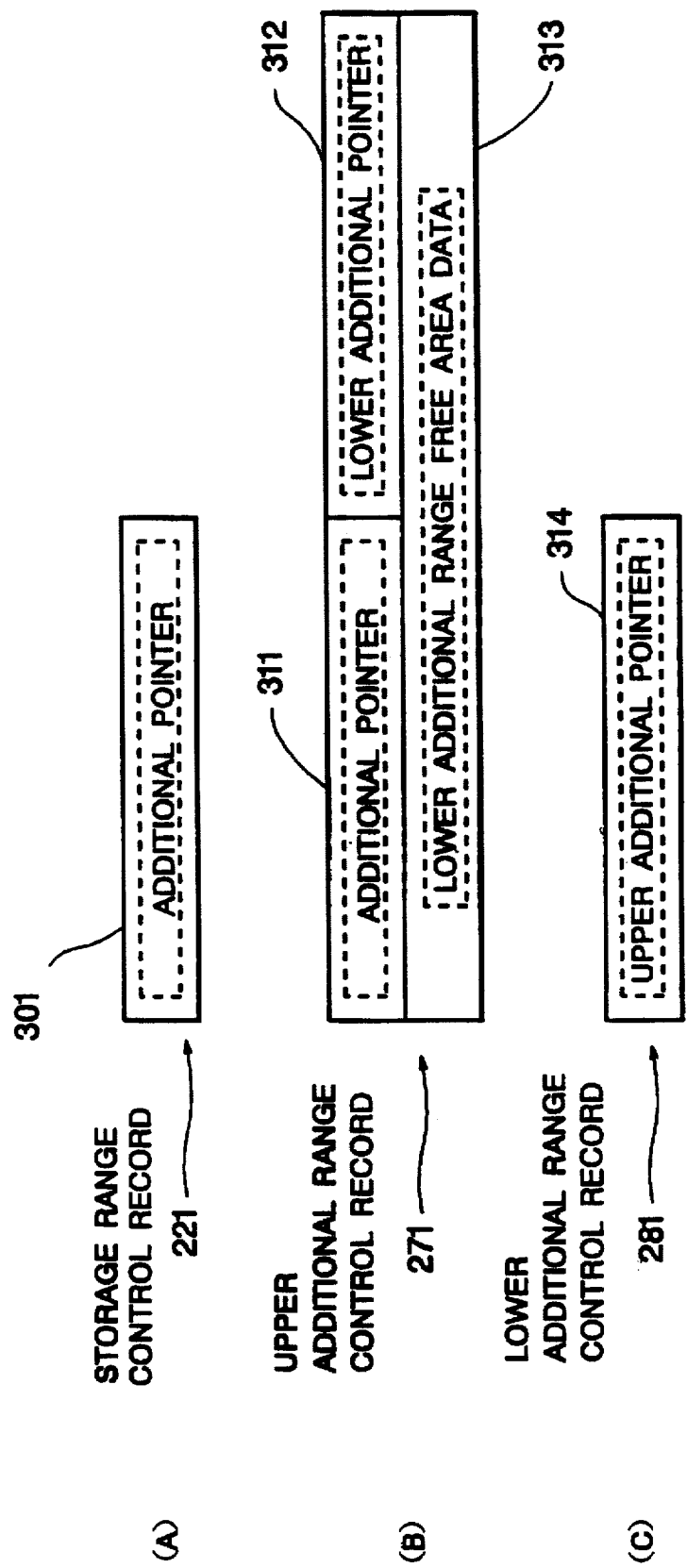

DATABASE SYSTEM CAPABLE OF CARRYING OUT AN EFFICIENT FREE AREA SEARCH

This application is a continuation of application Ser. No. 07/903,826, filed Jun. 24, 1992 now abandoned.

BACKGROUNDS OF THE INVENTION

1. Field of the Invention

The present invention relates to a database system for a computer system, and particularly relates to free area search processing in a database system provided with data files consisting of a data storage area to store data records and an overflow area to serve as an additional area when the data storage area overflows.

2. Description of the Prior Art

In a conventional database system of this type, when the storage area to which a data record is to be stored has no more free area and overflows, the data record is stored to an additional range in an overflow area connected to a storage range of the data storage area. To connect an additional range of the overflow area to the storage range of the data storage area, an additional range is pointed by the pointer in the storage range and the next additional range is pointed by another pointer at the additional range. Thus, a storage range and an additional range are just connected by addition pointers one after another. Accordingly, if no free area is found in the storage range where a data record is to be stored, free area searching processing conventionally required search of all additional ranges with following additional pointers at additional ranges one by one, so as to find out a free area in the connected additional ranges to store the data record.

Specifically, in searching for a free area to store a data record, it is checked whether the storage range where the data record is to be stored has a free area first. If there is not a free area, it is checked whether any additional range is connected to the storage range. If not, a new additional range is connected and the processing ends. If there are some additional ranges connected to the storage range, addition pointers are followed so as to acquire the next additional range, which is in turn searched for a free area. If there is a free area, the processing ends, but if not, it is again checked whether there is any other additional range connected, which is further searched for a free area.

In the conventional free area searching as described above, all the additional ranges must be searched one by one following the addition pointers in order to find a free area in an additional range. With this method, increased number of additional ranges connected to the storage range prolongs the time required to search for a free area, which results in lower processing speed of the entire database system.

SUMMARY OF THE INVENTION

An object of the present invention is to provide a database which can largely reduce the number of additional range search steps when searching for a free area to store a data record and thereby improve the speed of free area searching.

According to a preferred embodiment of the present invention to attain this object, a database system comprises a database and search means to search for a free area to store data of the database, and the database has data files constituted by a data storage area to store data and an overflow area to be added upon overflow at the data storage area. The data storage area comprising a plurality of storage ranges and the overflow area comprises at least an additional range connected to the storage range, the storage range has a control record storing the address of the upper additional range or ranges, the additional range comprises one upper additional range and one or more lower additional range connected to the upper additional range, and the upper additional range has a control record storing the address of the lower additional range or ranges to be connected, that of another upper additional range to be connected and the free area data for the lower additional ranges. Further, the searching means comprises storage range free area checking means to judge whether the storage range has any free area, upper additional range free area checking means to judge whether the upper additional range of the additional range has any free area, and lower additional range free area checking means to judge whether any free area exists by referring to the free area data for the lower additional ranges stored in the control record of the upper additional range.

According to another preferred embodiment, the searching means comprises upper additional range connection checking means to judge whether any upper additional range is connected to the storage range or an upper additional range, upper additional range acquiring means to acquire the next upper additional range when the upper additional range connection checking means judges that there is an upper additional range connected, upper additional range connecting means to connect a new upper additional range when the upper additional range connection checking means judges that no upper additional range is connected and lower additional range connecting means to connect a predetermined number of lower additional ranges to the newly connected upper additional range connected by the upper additional range connecting means.

According to further preferred embodiment, the free area data for the lower additional ranges stored in the control record of the upper additional range comprises a bit string, each of whose bits indicates the status (free or full) by the logical value.

According to still another preferred embodiment of the present invention to attain this object, a database system is characterized by that the data files of the database comprise a data storage area to store data and an overflow area to be added when overflow occurs at the data storage area. The data storage area comprises a plurality of storage ranges, and the overflow area comprises additional ranges connected to the storage ranges; the storage range has a control record storing the address of the additional range or ranges, the additional range comprises an upper additional range and one or more lower additional range connected to the upper additional range and the upper additional range has a control record storing the address of the lower additional range or ranges to be connected, address of another upper additional range to be connected and the free area data for the lower additional ranges.

Besides, the last one of the lower additional ranges has a control record storing the address of an upper additional range. Alternatively, free area data for lower additional ranges stored in the control record of the upper additional range may comprise a bit string, each of whose bits indicates the status (free or full) by the logical value.

Other objects, characteristics and effects of the present invention will be clarified in the detailed description below.

BRIEF DESCRIPTION OF THE DRAWINGS

FIG. 1 is a block diagram to show the entire configuration of a database system according to an embodiment of the present invention.

FIG. 2 is a flowchart to show the contents of free area search processing according to the present invention.

FIGS. 3A, 3B are diagrams to show the data file configuration of the database.

FIG. 4 is a diagram to show the control record contents for a storage range, an upper additional range and a lower additional range respectively.

DESCRIPTION OF THE PREFERRED EMBODIMENT

Figure 3A:
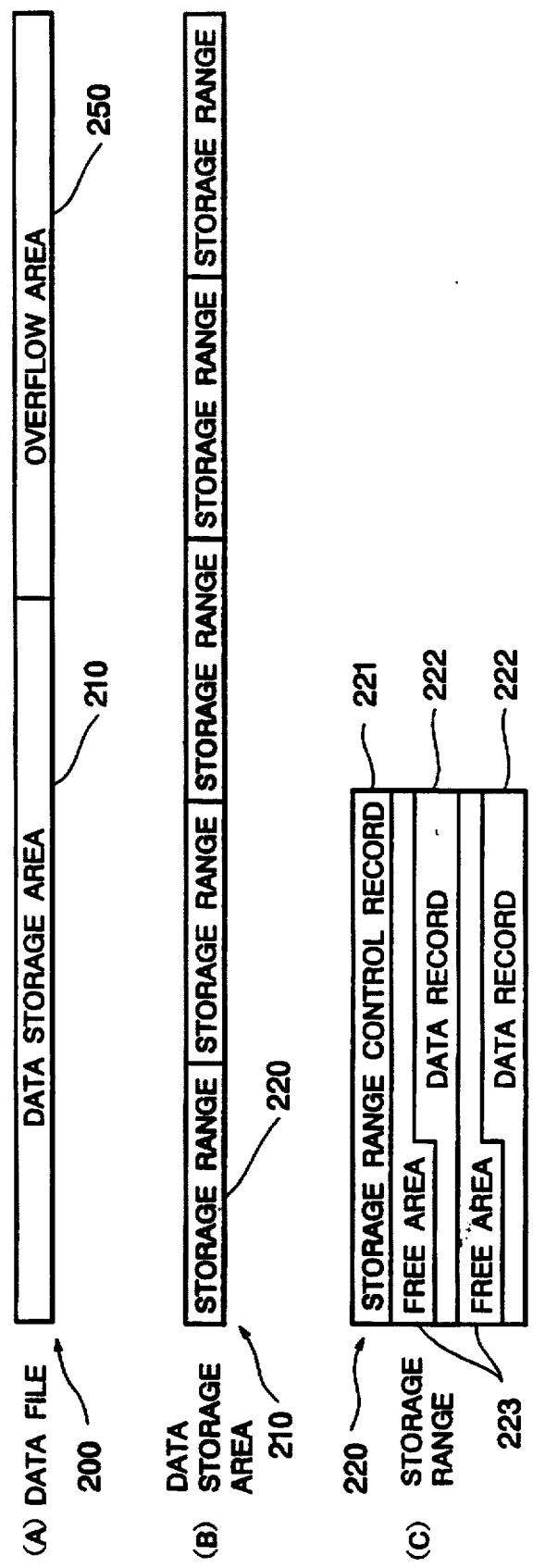

Referring to FIGS. 1 to 6, preferred embodiments of the present invention are now described. FIG. 1 shows the entire configuration of a database system according to an embodiment of the present invention. The numeral 10 indicates a database having data files, the numeral 20 is a database input/output unit to read data records from or write them to the database 10, the numeral 30 is a database processing unit and the numeral 40 is a database processing program. The database processing unit 30 executes, upon request from the database processing program 40, various processing procedures for the database 10 including retrieval, reference, updating and free area searching as described later.

The database processing unit 30 checks whether the database 10 has a free area to store data, using a storage range free area checking means 31, upper additional range connection checking means 32, upper additional range acquiring means 33, upper additional range free area checking means 34, lower additional range free area checking means 35, upper additional range connecting means 36, and lower additional range connecting means 37.

FIG. 2 is a flowchart to illustrate the free area search processing by the database processing unit 30. The free area search processing comprises a step 101 to check for free area in the storage range, a step 102 to judge whether any free area exists, a step 103 to check whether upper additional range is connected, a step 104 to judge whether any such range is connected, a step 105 to acquire upper additional range, a step 106 to check for free area in the upper additional range, a step 107 to judge whether any free area exists, a step 108 to check for free area in the lower additional range, a step 109 to judge whether any free area exists, a step 110 to connect new upper additional range and a step 111 to connect lower additional ranges.

Here, the step 101 to check for free area in storage range and the step 102 to judge whether any free area exists constitute the storage range free area checking means 31. The step 103 to check for upper additional range connected and the step 104 to judge whether any such range is connected constitute the upper additional range connection checking means 32. The step 105 to acquire upper additional range constitutes the upper additional range acquiring means 33 and the step 106 to check for free area in the upper additional range and the step 107 to judge whether any free area exists constitute the upper additional range free area checking means 34. The step 108 to check for free area in lower additional range and the step 109 to judge whether any free area exists constitute the lower additional range free area checking means 35. Besides, the step 110 to connect new upper additional range constitutes the upper additional range connecting means 36, and the step 111 to connect lower additional ranges constitutes the lower additional range connecting means 37.

Now referring to FIGS. 3 and 4, the data file configuration in the database 10, which characterizes the present invention, is now described in detail. In FIG. 3 (A), the data file 200 comprises a data storage area 210 to store data records and an overflow area 250 to store data records overflowing from the data storage area 210.

As shown in FIG. 3 (B), the data storage area 210 consists of some storage ranges 220. Data records are stored in these storage ranges 220. FIG. 3 (C) shows the structure of a storage range 220. At the starting position of the storage range 220, a storage range control record 221 is stored in advance. In FIG. 3 (C), the storage range 220 stores data records 222 with leaving free areas 223.

FIG. 3 (D) shows the structure of the overflow area 250. The overflow area 250 is divided into a plurality of areas, each of which contains combinations of an upper additional range 270 and lower additional ranges 280. One upper additional range 270 is accompanied by one or more lower additional ranges 280. The upper additional range 270 and the lower additional range 280 stores some data records as in the case of the storage range 220 above. Further, FIG. 3 (E) and FIG. 3 (F) show the structures of an upper additional range 270 and a lower additional range 280, respectively. As shown in the figures, the upper additional range 270 and the lower additional range 280 stores, at the starting position, the upper additional range control record 271 and the lower additional range control record 281 respectively.

The upper additional range 270 and the lower additional range 280 above may be connected to one of the storage ranges 220 when any data record overflows at the storage range 220.

The length of the upper additional range 270 and the lower additional range 280 constituting additional ranges 260 may be fixed or variable.

FIGS. 4 (A), (B), and (C) shows the configuration of the storage range control record 221, the upper additional range control record 271 and the lower additional range control record 281. Referring to FIG. 4 (A), the storage range control record 221 has a pointer 301 indicating the address of the upper additional range 270 in the additional range 260 connected to that storage range 220. By following the pointer 301, the upper additional range 270 in the connected additional range 260 can be located.

As shown in FIG. 4 (B), when an upper additional range 270 has another upper additional range 270 connected to it, the upper additional range control record 271 of the first upper additional range has a pointer 311 to indicate the address of the second upper additional range 270. It also has a lower addition pointer 312 to indicate the address of the lower additional range 280 connected to that upper additional range 270. When a plurality of lower additional ranges 280 are connected to it, one lower addition pointer 312 is stored for each lower additional range 280.

The upper additional range control record 271 stores a free area data 313 for lower additional ranges 280. The free area data 313 is a record to indicate whether any free area can be found among the predetermined number of lower additional ranges 280 connected to the upper additional range 270. The initial value of the free area data 313 indicates that there is a free area; when the lower additional ranges 280 are filled with data records, the free area data 313 indicates that there is no free area. The free area data 313 shows whether any free area can be found among all the connected lower additional ranges 280.

Figure 5:
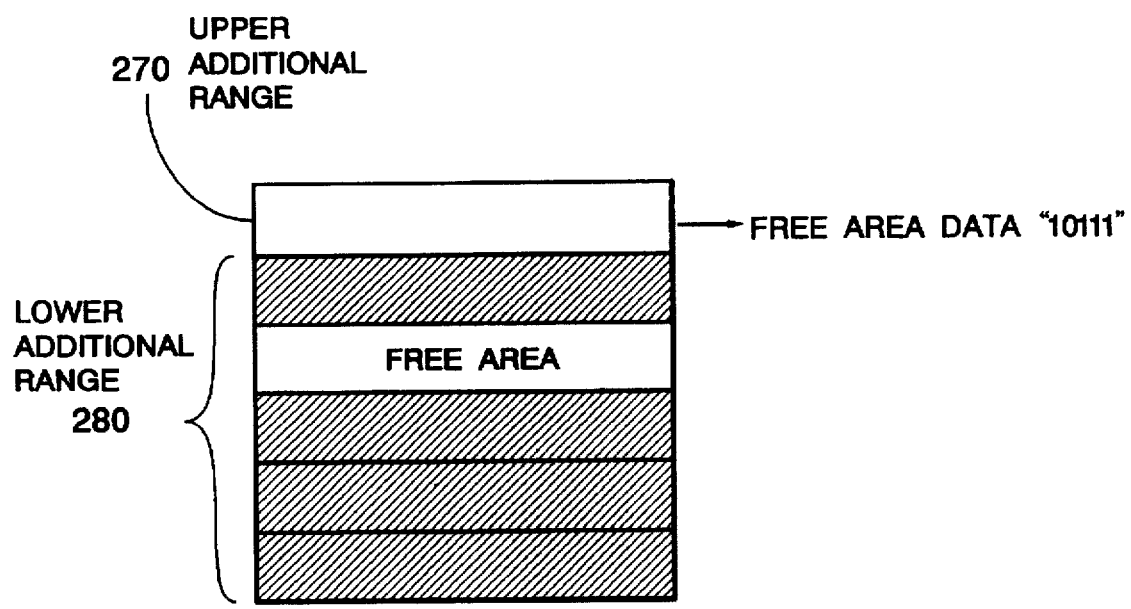
FIG. 5 is a diagram to show a connection example of lower additional ranges to an upper additional range.

The free area data 313 may comprise a bit for each lower additional range 280 so that the logical value of the bit indicates whether there is any free area or not in that range. For example, suppose an upper additional range 270 is accompanied by five lower additional ranges 280, the second lower additional range 280 has a free area, but all of the remaining lower additional ranges 280 are full as shown in FIG. 5. In this case, the free area data 313 in the upper additional range control record 271 stores a five-bit string "10111". Each of these bits corresponds to a lower storage range 280, and the logical value "1" indicates "full" and "0" indicates "free".

As shown in FIG. 4 (C), the lower additional range control record 281 has an upper addition pointer 314. The upper addition pointer 314 shows the address of the subsequent upper additional range 270. If a plurality of additional ranges 280 are connected to an upper storage range 270, the upper addition pointer 314 is stored in the lower additional range control record 281 of the last lower additional range 280.

Next, referring to FIG. 2, the processing of free area searching as described above is described.

To search for a free area to store a data record, the storage range free area checking means 31 checks whether the storage range 220 to which the data is to be stored as a data record 222 has any free area or not (Step 101). If there is any free area, the processing ends and the data record is stored.

If there is no free area in the storage range 220, the upper additional range connection checking means 32 checks whether any upper additional range 270 is connected to the storage range 220 (Step 103). If not, the upper additional range connecting means 36 connects a new upper additional range 270 (Step 110), and the lower additional range connecting means 37 connects a predetermined number of lower additional ranges 280, and terminates the processing (Step 111). An upper additional range 270 can be connected by specifying the applicable addition pointer 301 in the storage range control record 221. The lower additional ranges 280 may be connected by specifying the lower addition pointer 312 in the upper additional range control record 271.

If any upper additional range 270 is connected to the storage range 220, the upper additional range acquiring means 33 refers to the addition pointer 301 and acquires the connected upper additional range 270 (Step 105).

Next, the upper additional range free area checking means 34 checks for any free area in the acquired upper additional range 270 (Steps 106). If the upper additional range 270 has any free area, the processing ends. If not, the lower additional range free area checking means 35 refers to the free area data 313 in the upper additional range control record 271 of the upper additional range 270 to check for any free area in the predetermined number of connected lower additional ranges 280 (Step 108). The processing ends if any free area is found, but if not, the control is returned to Step 103.

Figure 6:
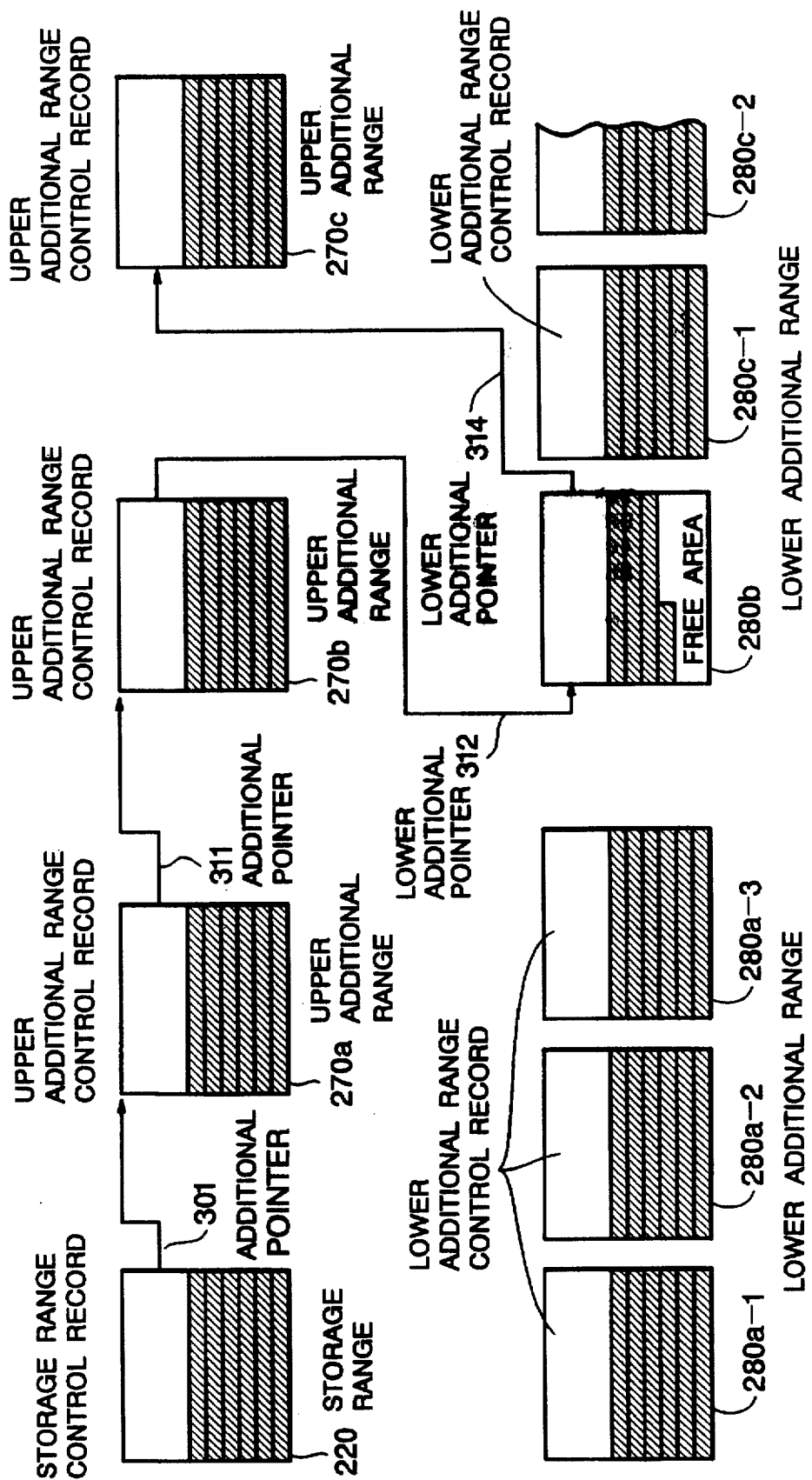
FIG. 6 is a diagram to show a specific example of free area searching according to the present invention.

FIG. 6 gives a specific example of searching. In FIG. 6, a storage range 220 is accompanied by three upper additional ranges 270a, 270b and 270c. The upper additional range 270a is accompanied by three lower additional ranges 280a-1, 280a-2 and 280a-3, the upper additional range 270b is connected with a lower additional range 280b and the upper additional range 270c is connected with two lower additional ranges 280c-1 and 280c-2. In this example, it is supposed that the storage range 220, the upper additional ranges 270a, 270b and 270c, lower additional ranges 280a-1, 280a-2 and 280a-3 and lower additional ranges 280c-1 and 280c-2 are all full and the lower additional range 280b is the only range having a free area.

Suppose the free area search processing is executed for the example in FIG. 6. The storage range free area checking means 31 checks whether the storage range 220 has a free area and judges that it does not have any free area (Steps 101 and 102). Then, the upper additional range connection checking means 32 is used to judge whether any upper additional range is connected (Steps 103 and 104). In this case, it is found that some upper additional ranges are connected. The upper additional range acquiring means 33 follows the addition pointer 301 to acquire an upper additional range 270a (Step 105).

Next, the upper additional range free area checking means 34 checks whether the acquired upper additional range 270a has any free area (Steps 106 and 107); there is no free area in this case. Then, the lower additional range free area checking means 35 refers to the free area data 313 in the upper additional range control record 271 of the upper additional range 270a to find that there is not any free area among the lower additional ranges 280a-1, 280a-2 and 280a-3 connected to the upper additional range 270a (Steps 108 and 109).

Thus, after searching for a free area in the upper additional range 270a, it is found that there is not any free area among the connected lower additional ranges 280a-1, 280a-2 and 280a-3 without searching them one by one just by reference to the free area data 313 in the upper additional range control record 271.

Next, returning to Step 103, the upper additional range connection checking means 32 checks whether other upper additional ranges are connected or not. In this case, another upper additional range 270b is still connected. The upper additional range acquiring means 33 follows the addition pointer 311 of the upper additional range 270a to acquire the upper additional range 270b. The upper additional range free area checking means 34 checks whether the acquired upper additional range 270b has any free area. It does not have any free area in this case. Then, the lower additional range free area checking means 35 refers to the free area data 313 in the upper additional range control record 271 of the upper additional range 270b to find that the lower additional range 280b connected to the upper additional range 270b has a free area.

As described above, even when a free area exists only in the lower additional range 280b, which is the sixth additional range, it can be found out in three steps of additional range searching including searches of the upper additional ranges 270a and 270b. In the above example, a conventional database system needled six steps of searching for the upper additional range 270a, lower additional ranges 280a-1, 280a-2 and 280a-3, upper additional range 270b, and lower additional range 280b in this order.

Thus, the database system of the present invention is designed to divide the additional ranges into upper and lower ones and to have the control record of the upper additional range contain free area data for the lower additional ranges for judgment of whether any free area exists in lower additional ranges. This enables substantial reduction in number of searching steps for additional ranges in searching for a free area to store data records, which results in free area searching at a higher speed.

Obviously many modifications and variations of the present invention are possible. It is intended to cover in the appended claims all such modifications as fall within the true spirit and scope of the invention.

What is claimed is:

1. A data processing system for free area search processing in a database system, comprising:
    a database; and search means for searching for a free area to store data of said database, said database having data files comprising a data storage area to store data and an overflow area to be added upon overflow at said data storage area, said data storage area comprising a plurality of storage ranges, said overflow area comprising at least one additional range connected to said plurality of storage ranges and an unused area for acquiring a new additional range, said additional range comprising one upper additional range and one or more lower additional ranges connected to said upper additional range, said plurality of storage ranges having a control record storing an address of said upper additional range in said additional range, and said upper additional range having a control record storing addresses of the one or more lower additional ranges connected to the upper additional range, an address of another upper additional range to be connected, and free area information for the one or more lower additional ranges, said free area information for the one or more lower additional ranges indicating a free or full status of one of the lower additional ranges to be renewed at the time of data store and elimination of the data in the one or more lower additional ranges, said searching means including:
  storage range free area checking means for judging whether said plurality of storage ranges have any free area,
  upper additional range free area checking means for judging whether the upper additional range of said additional range has any free area, and
  lower additional range free area checking means for judging whether any free area exists in the one or more lower additional ranges by referring to the free area information for the one or more lower additional ranges stored in the control record of said upper additional range.

2. The data processing system of claim 1, wherein said searching means comprises:

upper additional range connection checking means for judging whether any upper additional range is connected to the plurality of storage ranges or an upper additional range when said storage range free area checking means or said upper additional range free area checking means judge that a free area does not exist in the plurality of storage ranges or the upper additional range, upper additional range acquiring means for acquiring a next upper additional range by referring to the address of the next upper additional range when said upper additional range connection checking means judges that there is an upper additional range connected, upper additional range connecting means for connecting a new upper additional range in said unused area on said overflow area when said upper additional range connection checking means judges that no upper additional range is connected, and lower additional range connecting means to connect a predetermined number of lower additional ranges to the new upper additional range connected by said upper additional range connecting means, and wherein the free area information for the lower additional ranges stored in the control record of said upper additional range comprises a bit string, each bit of the bit string indicating a free or full status of one of the lower additional ranges.

3. A database system of claim 1, wherein the free area information for the lower additional ranges stored in the control record of said upper additional range comprises a bit string, each bit of the bit string indicates a free or full status of one of the lower additional ranges.

4. A database system of claim 3, wherein each of said lower additional ranges have a control record which includes the address of said upper additional range in said additional range.

5. A database system characterized in that data files of the database comprise:

a data storage area to store data; and an overflow area to be added when overflow occurs at said data storage area, said data storage area including a plurality of storage ranges, and said overflow area including one or more additional ranges connected to said plurality of storage ranges and an unused area for acquiring a new additional range, said one or more additional ranges including an upper additional range and one or more lower additional ranges connected to said upper additional range, said plurality of storage ranges having a control record storing an address of at least said upper additional range in said additional ranges, said upper additional range having a control record storing addresses of the one or more lower additional ranges to be connected, an address of another upper additional range to be connected and free area information for the lower additional ranges, and said free area information for the one or more lower additional ranges indicating a free or full status of one of the lower additional ranges to be renewed at the time of data store and elimination of the data to the one or more lower additional ranges.

6. A database system of claim 5, wherein the free area information for the lower additional ranges stored in the control record of said upper additional range comprises a bit strings each bit of the bit string indicates a full or free status of one of the lower additional ranges.

7. A database system of claim 6, wherein each of said lower additional ranges have a control record which includes the address of said upper additional range in said additional range.

* * * * *